(12) United States Patent
Barnes et al.

(10) Patent No.: US 7,681,674 B1
(45) Date of Patent: *Mar. 23, 2010

(54) SYSTEM FOR POSITIONING TRANSPORTABLE AND RELOCATABLE HEAVY EQUIPMENT

(75) Inventors: R. Michael Barnes, Magnolia, TX (US); Robert R. Cuddie, Marble Falls, TX (US); Richard E. Robey, Houston, TX (US)

(73) Assignee: Loadmaster Engineering, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/329,287

(22) Filed: Dec. 5, 2008

(51) Int. Cl.
*B62D 51/06* (2006.01)

(52) U.S. Cl. .................. 180/8.1; 180/6.48; 180/8.5; 180/8.6; 280/761

(58) Field of Classification Search ............ 180/6.47, 180/8.11, 14.2; 280/12.11, 763.1, 764.1, 280/765.1, 766.1, 105
See application file for complete search history.

(56) References Cited

U.S. PATENT DOCUMENTS

| | | | | | |
|---|---|---|---|---|---|
| 3,211,400 | A | * | 10/1965 | Booth | 244/50 |
| 3,576,225 | A | * | 4/1971 | Chambers | 180/8.5 |
| 3,680,321 | A | * | 8/1972 | Bordes | 405/201 |
| 3,769,802 | A | * | 11/1973 | Wefer | 405/201 |
| 3,796,276 | A | * | 3/1974 | Maeda | 180/8.5 |
| 3,893,531 | A | * | 7/1975 | Gee | 180/6.48 |
| 4,029,165 | A | * | 6/1977 | Miller et al. | 180/6.48 |
| 4,033,056 | A | * | 7/1977 | Demmers | 37/309 |
| RE29,541 | E | * | 2/1978 | Russell | 175/52 |
| 4,124,129 | A | * | 11/1978 | Barry | 414/343 |
| 4,395,191 | A | * | 7/1983 | Kaiser | 414/694 |
| 4,449,734 | A | * | 5/1984 | Cory | 280/766.1 |
| 4,479,750 | A | * | 10/1984 | Johnson, Jr. | 414/392 |
| 4,612,861 | A | * | 9/1986 | Lindquist | 104/166 |
| 4,823,870 | A | * | 4/1989 | Sorokan | 166/79.1 |
| 5,312,119 | A | * | 5/1994 | Schneider et al. | 280/766.1 |
| 5,453,931 | A | * | 9/1995 | Watts, Jr. | 701/23 |
| 5,492,436 | A | * | 2/1996 | Suksumake | 405/201 |
| 5,496,013 | A | * | 3/1996 | Lussier | 254/105 |
| 5,921,336 | A | * | 7/1999 | Reed | 180/8.1 |
| 6,079,510 | A | * | 6/2000 | Miyamoto | 180/8.3 |
| 6,152,792 | A | * | 11/2000 | Lanni et al. | 440/40 |
| 6,234,527 | B1 | * | 5/2001 | Poulin et al. | 280/761 |
| 6,276,758 | B1 | * | 8/2001 | Hoffmann et al. | 299/39.6 |

(Continued)

FOREIGN PATENT DOCUMENTS

GB 2106464 A * 4/1983

*Primary Examiner*—Lesley Morris
*Assistant Examiner*—Brodie Follman
(74) *Attorney, Agent, or Firm*—Buskop Law Group, PC; Wendy Buskop (57) ABSTRACT

A system for positioning a transportable and relocatable equipment having at least four walking assemblies attached to transportable and relocatable equipment each walking assembly has a walking pad, roller tread for rolling the roller bearing surface, a lift assembly connected to the central collar, a rotatable motion gear assembly disposed around the lifting assembly, a motor for actuating the rotatable motion gear assembly, a pivoting collar disposed around the rod operated by a controlling means with a processor, a push pull travelling system for receiving fluid and extending a specified distance causing movement of the equipment in a first direction, and enabling the walking assemblies to raise, reorient, lower, and travel of the transportable and relocatable heavy equipment in a second direction using the treads.

16 Claims, 7 Drawing Sheets

U.S. PATENT DOCUMENTS

| | | | |
|---|---|---|---|
| 6,581,525 B2 * | 6/2003 | Smith | 104/96 |
| 6,581,698 B1 * | 6/2003 | Dirks | 175/52 |
| 6,692,185 B2 * | 2/2004 | Colvard | 404/105 |
| 7,182,163 B1 * | 2/2007 | Gipson | 180/8.1 |
| 7,290,799 B2 * | 11/2007 | Santos | 280/766.1 |
| 7,293,607 B2 * | 11/2007 | Lambert et al. | 166/75.11 |
| 7,328,761 B1 * | 2/2008 | Tyler | 180/13 |
| 7,481,285 B1 * | 1/2009 | Savage | 180/8.1 |
| 7,584,979 B2 * | 9/2009 | Labonte et al. | 280/293 |
| 2006/0084911 A1 * | 4/2006 | Belef et al. | 604/95.01 |
| 2006/0213698 A1 * | 9/2006 | Gaetani | 180/6.3 |
| 2007/0089925 A1 * | 4/2007 | Addleman | 180/313 |
| 2007/0193749 A1 * | 8/2007 | Folk | 166/379 |
| 2008/0164078 A1 * | 7/2008 | Rhodes et al. | 180/6.48 |
| 2009/0038862 A1 * | 2/2009 | Hammonds | 180/6.48 |
| 2009/0142171 A1 * | 6/2009 | Weigand et al. | 414/467 |

* cited by examiner

SYSTEM FOR POSITIONING TRANSPORTABLE AND RELOCATABLE HEAVY EQUIPMENT

FIELD

The present embodiments relate to a system for transporting and relocating heavy equipment, such as drilling rigs, bridges, and large tubulars for drilling without the need for a tractor.

BACKGROUND

A need exists for an easy to maneuver system for supporting a rig, that can reorient a drilling rig or other piece of heavy equipment without the need for a tractor, or a "sow".

A further need exists for a system that is durable, low maintenance and modular, so that if one component fails, three can keep working and perform the movement needed.

A need exists for a system that can automatically move the heavy equipment enabling a user to be in a safe place away from the moving equipment.

A need exists for a fleet of heavy transport vehicles that can be globally tracked from a remote location preventing inadvertent "loss" of a rig due to a sandstorm or snowstorm.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a system for moving heavy equipment and relocating the heavy equipment to various places in a short period of time, typically half of the time ordinarily required to moves rigs. For example, with the system, a drilling rig can be moved about 60 feet in about 6 hours, which was 1/10 of the time for ordinary disassembly and reassembly of a rig.

An embodiment of the invention enables a rig to be moved and its tractor released from the frame within an hour of positioning. This system dramatically reduces the cost of leasing both a transport tractor and trailer, enabling the tractor to be redeployed to another job practically immediately. The rental of tractors, known as "sows" are expensive, and the day rates of at least $360 an hour per day plus at least 4 meals for $20 each per operator are well known. If a tractor or "sow" is delayed for 24 hours, then the expense can be over $6000 per day. The invention saves these costs, because conventionally sows are typically needed for at least 1 day and up to 3 days, which anticipates a cost of $18,000 saved per use of this system.

The embodiments enable repositioning well to well of drilling equipment without having to lay rails or use a separate "sow". This invention enables greater versatility and mobility in hard climate areas such as arctic drilling areas, desert areas, or even in West Texas, which is known for sandstorms.

An embodiment of this invention enables the rig to be moved without a tractor for small distances up to about 1000 feet, and in an emergency situation, even walk up to a mile. Mats can be put down under the walking pads to make sure the supported equipment does not fall off the transport vehicle. The invention contemplates that the movement can be done remotely using wireless connections to a network such as the Internet, a cellular network or through a plurality of networks simultaneously.

The invention contemplates creating a trackable fleet of rigs for moving heavy lift equipment using transmitting radio frequency identification "RFID" tags, which can be tracked by a satellite network and/or global positioning equipment, enabling pinpoint precision on the location of the rig which can be usable during a blizzard or sandstorm.

An embodiment of this invention can enable the movement of heavy equipment such as a drilling rig to be done automatically and even remotely, so that humans are safer during transport of the heavy equipment.

The system can be used to move all kinds of structures, pipe trailers, equipment, prefabricated bridges, modular buildings and similar types of heavy construction applications.

The embodiments can further relate to a system for positioning a transportable and relocatable drilling rig. The drilling rig can be a land based drilling rig for use on the arctic slopes or in the deserts of Afghanistan which have few repair facilities, and limited resources, harsh climates and conditions causing sow engines to wear out.

The system can have at least four walking assemblies attached to a frame for supporting transportable and relocatable equipment.

Each walking assembly can have a walking pad for walking on a surface. A load bearing surface for rolling against a roller tread can be used. The roller tread can be contained in a roller tread housing. The roller tread housing can have a central collar.

Each walking pad can be circular or square having a thickness of between about 1/4 inches to about 1 inch.

Each walking pad can be made from steel or composite provided each walking pad can support between about 1 ton to about 8 tons of weight.

Each walking pad can be perforated in part, enabling the pads to walk through water without tipping, on shifting sands without tipping, or on snow without failing in transport. The diameter of the walking pad, if circular, can be between about 48 inches to about 96 inches.

The system can include a lift assembly connected to the central collar. The lift assembly can have a rod for engaging the central collar, a flange slidably disposed around the rod and a lifting device, which can be removably connected to the flange.

The lift assembly can be made from steel, can have a length of between about 24 inches to about 48 inches, and can have a diameter between about 7 inches to about 9 inches.

The lift assembly can have a central annulus, which can have an inner diameter between about 6 inches to about 18 inches. A lift assembly can be purchased from Hyco Canada of Quebec, Canada.

The system can further include a rotatable motion gear assembly disposed around the lifting assembly.

The rotatable motion gear assembly can be contemplated to have the following characteristics: a high numerical ratio, low angular backlash and a compact profile. Such a gear assembly can be purchased from Kinematics Manufacturing. Inc. of Phoenix, Ariz.

A motor can be used to activate the rotatable motion gear assembly. The motor can be a DC motor using between about 24 volts to about 440 volts. In an additional embodiment, an AC motor, a pneumatic motor, or a hydraulic motor can be used. A hydraulic motor usable in the system can be one available from Bosch Rexroth AG.

A pivoting collar can be disposed around the rod. The pivoting collar can receive fluid, such as hydraulic or pneumatic fluid, from a controlling means. The controlling means can also dispense hydraulic or pneumatic fluid as working fluid.

The pivoting collar can have an inlet port for receiving the fluid. The inlet port can have a diameter between about 0.5 inches to about 1 inch. The pivoting collar can have an overall diameter of between about 8 inches to about 20 inches and can fit slidingly against the rod.

The controlling means can have a single inlet for receiving fluid from a fluid source. The controlling means can further have a plurality of fluid outlets as well as a processor for receiving sensor signals from sensors attached to each walking assembly. The controlling means can further communicate with a global positioning system and possibly with installed transmitting RFID tags. The processor can be use computer instructions, which can be located in memory or associated data storage, and can be connected to a to give exact coordinates, specifications, and orientations of each walking pad including but not limited to direction, such as degrees north west, and height of the walking pad, such as "rising to about 8 inches" per motion of the walking pad assembly.

The pivoting collar can have two parts, a collar stationary segment disposed around the rod and a collar rotating segment disposed around the collar stationary segment. The fluid can flow to the collar stationary segment and then to the collar rotating segment enabling hose-free rotating of the pivoting collar. The fluid can flow at a flow rate between about 0.01 gallons to about 6 gallons per minute. The fluid, if it is a liquid can be a laminar flow.

A push pull traveling system can receive the working fluid from the controlling means.

In an embodiment, the push pull traveling system can have a push pull traveling system first side secured to one side of the roller tread housing and a push pull traveling system second side disposed on an opposite side of the roller tread housing. The push pull traveling system can be adapted to extend a specified distance causing movement of the equipment in a first direction.

The controlling means, in an embodiment, can receive fluid from a fluid source and flows out fluid to the collar stationary segment and flows still more fluid to the lift assembly enabling the walking assemblies to actuate.

The fluid can enable the walking assemblies to raise, reorient, and lower the walking pads independent of each other or in pairs synchronously. The fluid can also enable the treads to actuate, rolling like a tank tread, enabling travel of the transportable and relocatable heavy equipment in a second direction.

In an embodiment, the rotatable motion gear assembly can be a rack and pinion or a rotary gear set. An example of the rack and pinion can be one available from Alpha Gear. Other usable rotary gear sets can be one available from Kinematics.

In another embodiment, the flange can be made from two flanges, namely a square flange for removably engaging the transportable and relocatable equipment. The square flange can be removably attached to a round flange for providing a sealing engagement with the lifting device. These flanges can have inner diameters of between about 10 inches to about 20 inches and in the case of the round flange, have an outer diameter of between about 10 inches to about 20 inches. The square flange can have sides that are between about 10 inches to about 36 inches in length.

In yet another embodiment, the central collar can be formed from a first collar half that can connect with a second collar half. These two collar halves can be made from a rigid, non-flexing material. The two halves can abut together, meeting, to form the central collar.

The purpose of the central collar is to locate and engage the roller tread housing about the lifting rod.

The rotatable motion gear assembly can be a hydraulic slewing drive such as those available from Kinematics Manufacturing of Phoenix, Ariz.

The system can use a rotatable motion gear assembly formed from a stationary ring surrounded by a rotating ring. The rotating ring can be actuated by a gear supported on a gear shaft driven by the motor.

The stationary ring can have an outer diameter of about 17 inches to about 19 inches and a height between about 3 inches to about 5 inches. The stationary ring can be made from iron or steel. The rotating ring can have an inner diameter of between about 12 inches to about 22 inches and an outer diameter between about 14 inches to about 24 inches. The rotating ring can slide around and can be disposed around the circumference of the stationary ring.

An embodiment of the invention, contemplates that the push pull traveling system first side can be a first hydraulic cylinder and the push pull traveling system second side can be a second hydraulic cylinder. Each of the hydraulic cylinders can be contemplated to extend between the roller tread housing and the walking pad so the roller tread housing can move a stroke distance causing the transportable and relocatable heavy equipment to travel a proportional distance. Usable hydraulic cylinders can have pistons that are about 24 inches to about 48 inches long. Examples of pistons usable in the embodiments, can be those available from Hyco Canada.

Another embodiment of the system can contemplate that for each walking pad of the plurality of walking pads, one or two rods can be positioned at different vertical heights than the other rods.

Alternatively, the plurality of walking pads can have two pads with at least two rods that can be positioned for synchronous movement, which in this application can be interpreted to mean, at the same speed.

In an embodiment, it can be contemplated that all pads can be on the surface at one time.

Sensors can be attached to the square flange and create a communication with the processor of the control means for detecting movement of the walking assemblies, in terms of height of the walking pads and magnetic direction, such as NNW in degrees. The sensors can provide a wireless or hard wired connection to provide signals to the processor of the controlling means.

A global positioning system ("GPS") can be collocated with the processor in the controlling means. The GPS system can be in wireless communication with the processor and a satellite network to facilitate orientation of the walking system and enabling the walking pad assemblies to be self steering, and run from remote positions, such as a building that is warm, when the assembly is outside in the sub zero arctic cold.

The system can be used to transport and relocate a drilling rig.

The system can be used to track the locations of similar walking assemblies, to obtain positions of the fleet, in case one got lost in a snow drift or sand storm.

An embodiment of the invention can contemplate that the collar rotating segment can enable hose-less pivoting while rotating the hydraulic pivoting collar more than 360 degrees. The term "hose-less" can refer to a fluid connection that does not require a hose to span a distance between two fittings. In this case, the pivoting collar can provide the means for fluid flow between fittings while sealing against environmental conditions and maintaining system pressure.

A positive locating device can be useable in an embodiment, which can be disposed around the rod. The positive locating device can be a stop, a magnet, a gear set, or combinations thereof. Dimensions of the stop can be about 1 inch high. The stop can be made from steel or iron. An iron alloy can be used as an electro magnet core on one of two opposing faces by applying a current to a set of windings around the iron, the two faces can mate positively. The gear set can also be a positive locating device by engaging two opposing gears into a mesh.

In an embodiment, the push pull traveling system can be a set of hydraulic pistons, such as those made by Hyco Canada, or a rack and pinion system such as those made by Alpha Gear. The push pull traveling system can also be a set of pneumatic pistons, such as those made by Parker Hannifin Corp., or a set of linear actuators, such as a model made by Parker Hannifin Corp.

The lift assembly, the lifting device and the pivoting collar can be hydraulic.

The first and second fluids can be hydraulic fluids, such as an oil, a compressed air having a pressure between about 500 psi to about 5000 psi, another compressed gas such as inert nitrogen, helium, hydrogen or another compressed gas like carbon dioxide having a pressure between about 250 psi to about 8000 psi, or a compressed vapor mixture such as a water/air mixture.

The system can operate in an embodiment by using a fluid, such as hydraulic oil, to lift the heavy equipment and to operate the lift assembly with at least one rotatable motion gear assembly, raising the heavy lift equipment off the ground.

Next, the fluid which in another embodiment can be compressed air, can be used to disengage at least one rod in one of the four walking assemblies secured to the lift assembly.

Then, fluid can be used to extend at least one of the four different push pull travelling systems. By extending out, the push pull travelling system can move the heavy equipment in a first direction by rolling at least one of the roller treads against at least one of the roller load bearing surfaces of the walking assembly.

Next, fluid can be used to raise at least one of the four walking assemblies with the lift assembly. The raising can be to a height between about 1 inch to about 36 inches.

It can be noted that two of the four walking assemblies can be raised simultaneously.

Fluid can be used to pivot the at least one walking assembly in a opposite direction opposite the first direction, and then fluid can further be used to retract at least one push pull travelling system.

Fluid can then be used to rotate the raised walking assembly about each assembly rod to orient the raised walking assembly in a second direction and by using the rotatable motion gear assembly and the motor. It can further be noted that the fluid can be controlled using a control means that allows fluid to flow in from a source and out through two or more ports for operating the various pieces of equipment.

Figure 1:
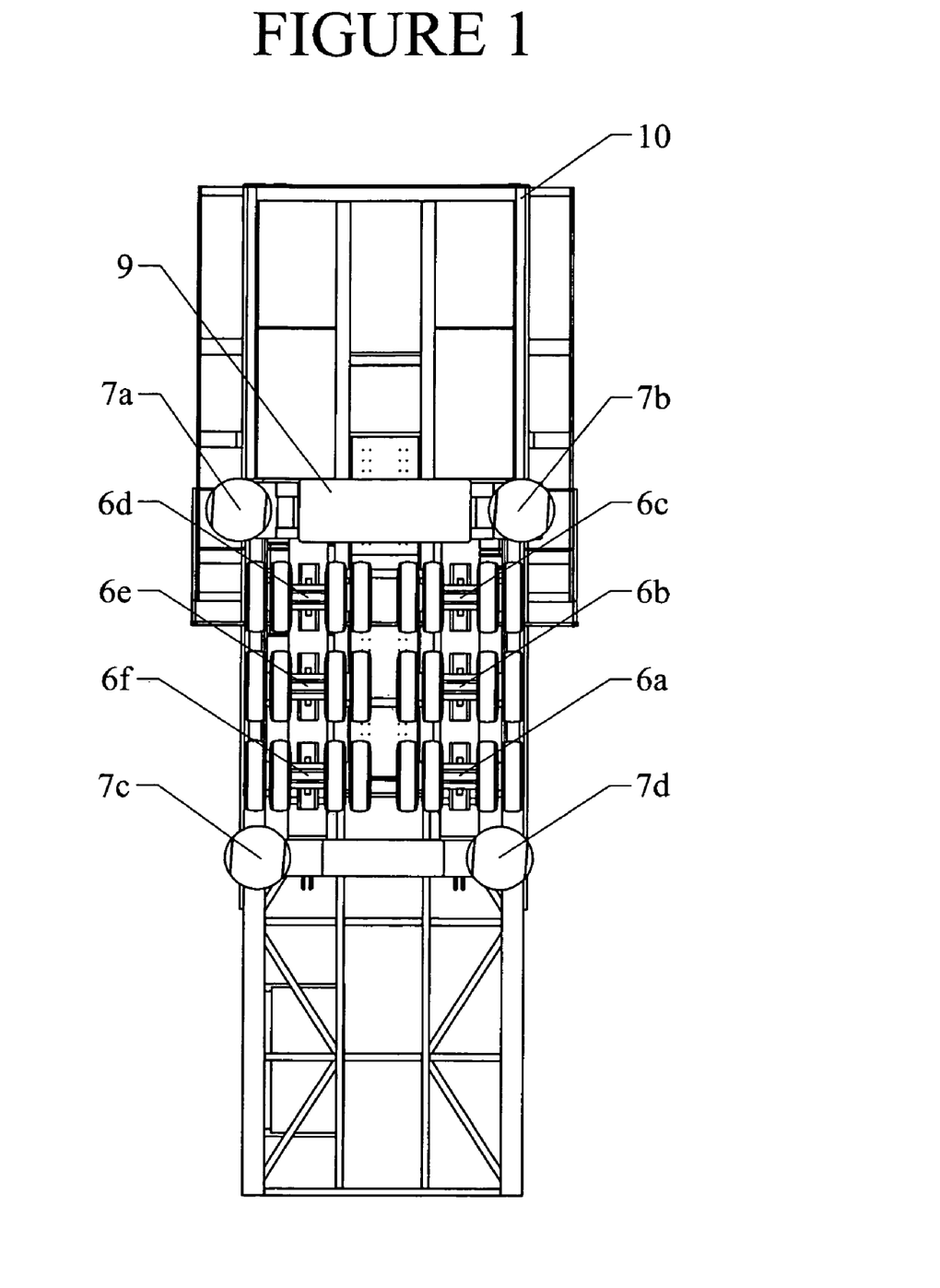
FIG. 1 depicts a bottom view of an embodiment of the system.

Turning now to FIG. 1, a bottom view is shown with a plurality of slightly rotatable axels 6a, 6b, 6c, 6d, 6e and 6f each supporting at least two tires. Four walking pads 7a, 7b, 7c and 7d are shown and can be supported by a frame 9 surround the tires and axes. The tires, axels and walking assemblies can support the frame 9, which can hold the transportable and relocatable equipment 10. The walking assemblies can be positioned on the outer periphery of the six axels with between 2 tires to 4 tires per axel.

Figure 2:
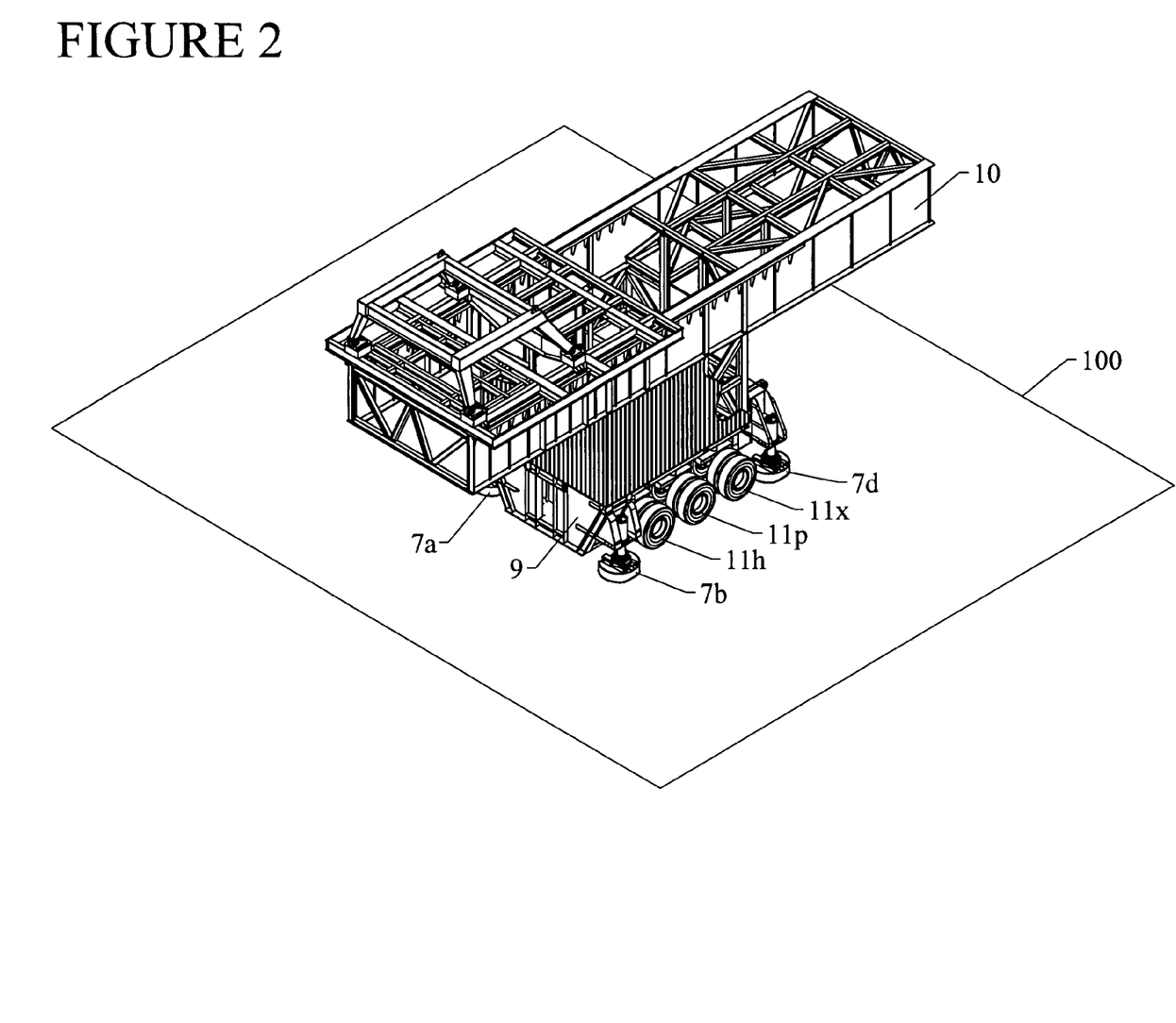
FIG. 2 depicts a perspective view of an embodiment of the system.

FIG. 2 shows a side perspective view of the three tires 11h, 11p and 11x positioned between the walking pads 7b and 7d. Also shown in FIG. 2 is walking pad 7a.

Walking pads 7b and 7d of respective walking pad assemblies can both engage a surface 100, such as the ground. Also in this Figure is transportable and relocatable equipment 10, which in this embodiment, can be part of a drilling rig supported on frame 9.

The overall size of the frame 9 can be between about 8 feet wide to about 51 feet wide and between about 20 feet to about 67 feet long, which can make it easy to take down a conventional street as a "wide load".

The frame 9 can have a connector for engaging with a "sow" or other similar tractor for pulling or pushing the frame. The frame can be off the ground on tires between about 20 inches to about 60 inches which can be adequate for normal ground clearances. The walking pads are anticipated to lift the frame 9 at least about 12 inches to about 30 inches off the ground when fully extended.

Figure 3:
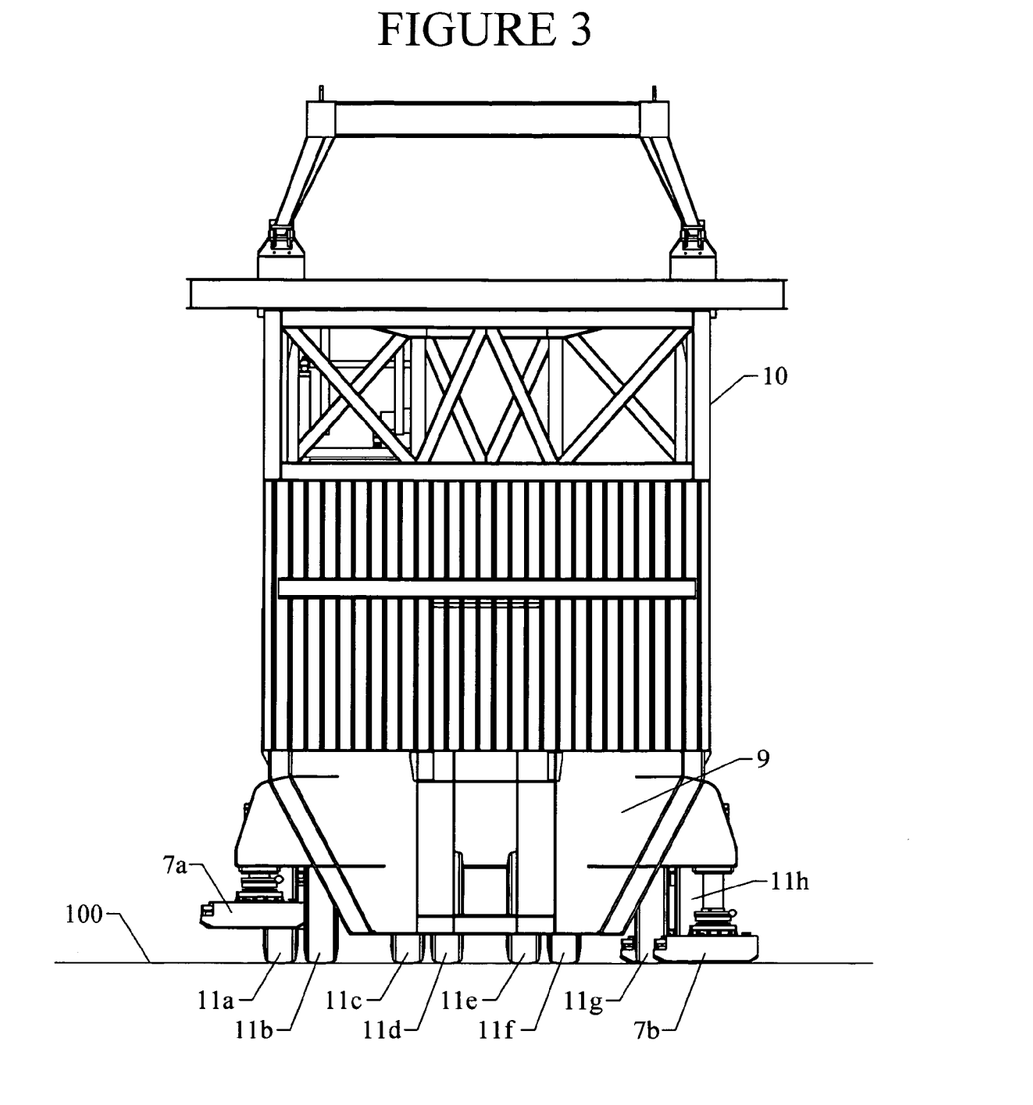
FIG. 3 depicts a front view of the system with frame and loaded drilling rig according to the invention.

FIG. 3 shows a front view of an embodiment wherein the walking pad 7a is shown off the surface 100 and the walking pad 7b is shown engaging the surface 100. Eight tires are shown in this view as elements 11a, 11b, 11c, 11d, 11e, 11f, 11g and 11h. The tires support the frame 9 which can hold part of a derrick of a drilling rig as transportable and relocatable equipment 10.

Figure 4:
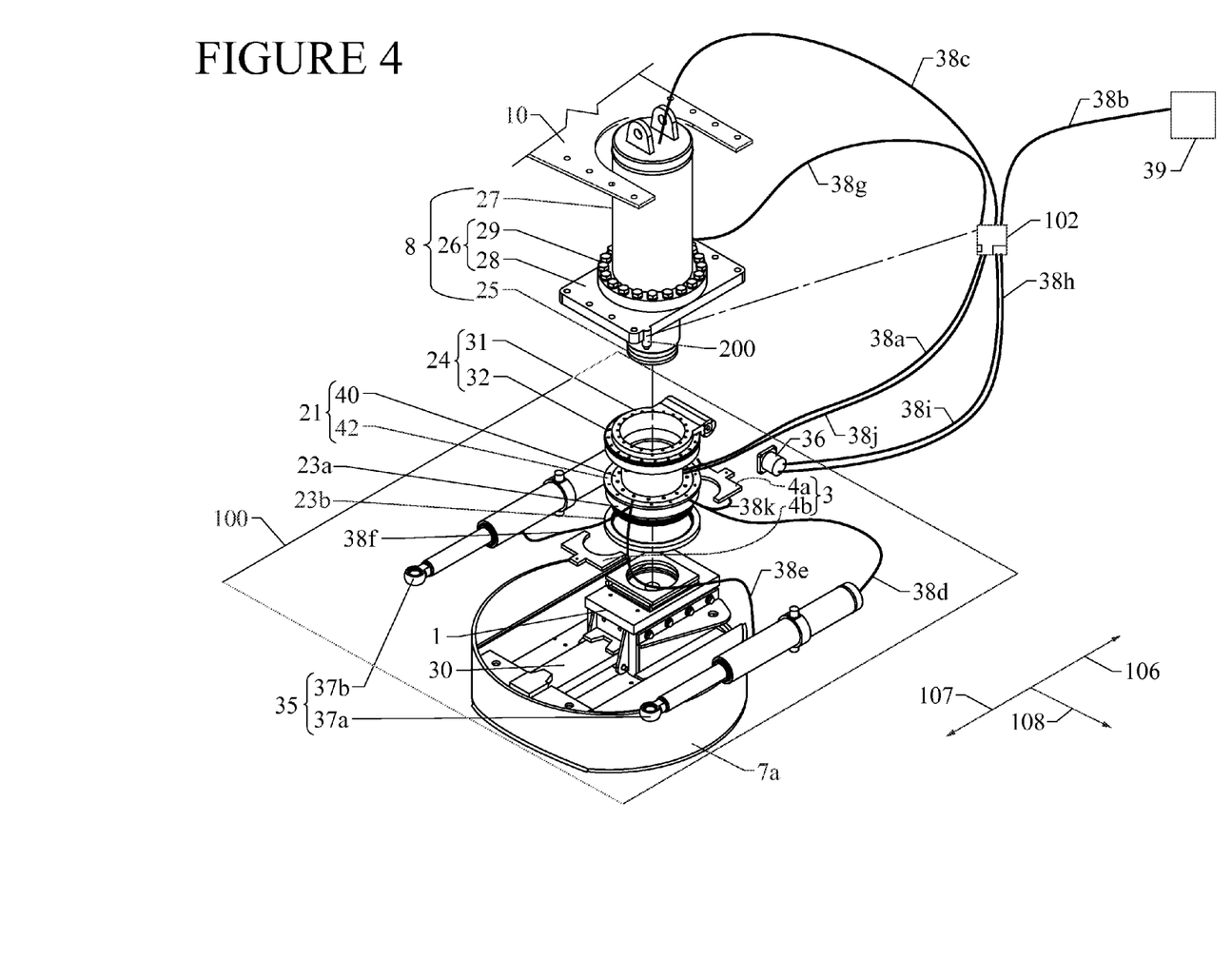
FIG. 4 depicts an exploded view of a walking pad assembly according to the invention.

FIG. 4 is an exploded view of the apparatus used for operating the walking assemblies which each assembly includes a walking pad. In this embodiment, a roller tread housing 1 is shown. The roller tread housing can be made of steel can be between about 4 inches tall by about 4 inches wide to about 12 inches tall by about 12 inches wide.

Figure 7:
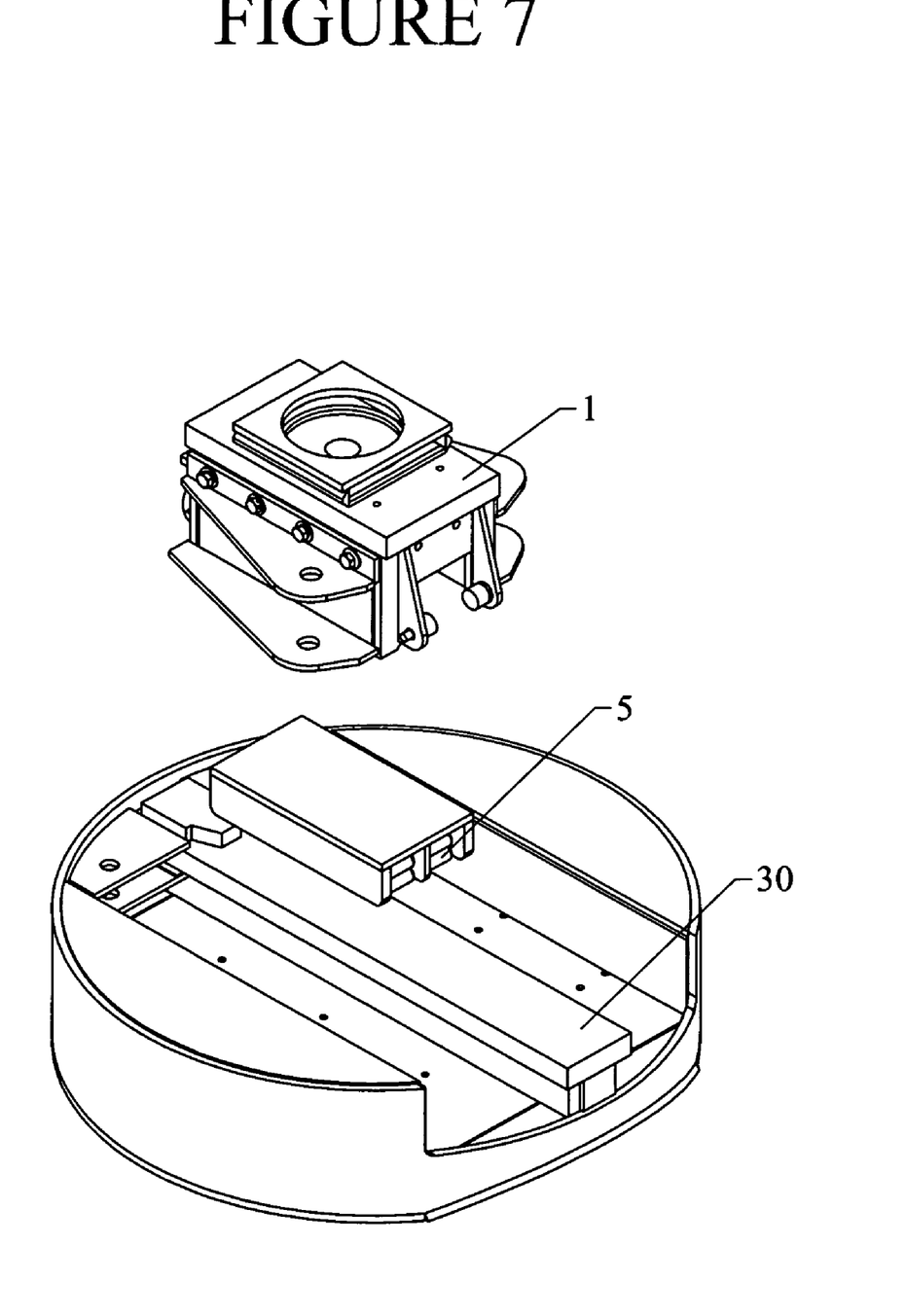
FIG. 7 depicts a roller tread housing and associated tread usable in this system.

The roller tread 5, best seen in FIG. 7, in the roller tread housing 1 can be about 1 inch to about 6 inch inches high by about 1 inch to about 12 inches wide. A roller bearing surface 30 can be disposed on walking pad 7a. The roller bearing surface 30 can allow the roller to move against it, and provide motion translating along its surface.

The walking pad 7a is shown with the push pull travelling system 35.

The central collar 3 has a first collar half 4a that abuts a second collar half 4b that is centrally located about rod 25.

Rod 25 can be a part of the lift assembly 8, which can have a lifting device 27. In this Figure, flange 26 is shown as a two part assembly of a round flange 29 disposed on a square flange 28. The two flanges can be fastened together forming flange 26. A sensor 200 is shown attached to the square flange.

A rotatable motion gear assembly 24 can be disposed about the rod 25 and has stationary ring 31. A rotating ring 32 can be disposed around the stationary ring 31.

Mounted to the rotatable motion gear assembly 24 can be motor 36. Fluid can flow from a controlling means 102 to the motor 36 to operate the rotatable motion gear assembly 24.

In an embodiment the controlling means 102 can obtain fluid from a fluid source 39 as fluid 38b. The controlling means 102 can also flow fluid as fluid 38c to the lifting device 27.

The controlling means 102 can also flow fluid as fluid 38a to the pivoting collar 21. Fluid 38j is also shown. The controlling means can include a processor 202 with memory or in communication with data storage having computer instructions for processing sensor signals from sensor 200 attached to flange 26. The sensor can provide information on the orientation of each walking pad assembly, on the rate of movement, and amount of vertical lift used by each walking pad. The sensor can be in wireless communication with the processor 202. The sensor 200 can be an optical sensor, such as an optical rotary encoder.

Additionally, in an embodiment, fluid not only flows as fluid 38i to the motor, but can also flow as fluid 38h from the motor 36, which can flow fluid back to the controlling means.

Fluid can also flow from the controlling means 102 as fluid 38c to the lift assembly 8 and then back through as fluid 38g.

Fluid can flow to the central collar 3 from the controlling means 102 and from the central collar 3 as fluid 38d to the push pull traveling system first side 37a, and then from the push pull traveling system first side as fluid 38e. Fluid can also flow to the push pull travel system second side 37b as fluid 38k. Fluid can flow back from the second side 37b depicted as fluid 38f.

The pivoting collar 21 can be made of a collar stationary segment 40 and a collar rotating segment 42.

Secured to the pivoting collar 21 can be a positive locating device which is depicted as having two components in this figure, namely first positive locating portion 23a and second positive locating portion 23b.

From the pivoting collar 21, fluid can flow via fluid 38d to the push pull travelling system 35.

The second positive locating portion 23b can be attached to the roller tread housing 1, as shown in this Figure.

The push pull travelling system 35 in FIG. 4 is shown with a push pull traveling system first side 37a and push pull travelling system second side 37b which are symmetrically opposed to each other. This Figure depicts the first and second sides as being hydraulic cylinders, which can be about 7 inches to about 10 inches in diameter, up to about 36 inches in length extended and about 18 inches in length retracted. The piston can have about a 6 inch diameter in the cylinder in this embodiment.

The push pull travelling system 35 can create travel in a first direction 106 after lifting by the lifting device 27. After movement, the push pull travelling system can be retracted in the opposite direction 107 and then the system can be rotated by the rotatable motion gear assembly 24 to a second direction 108, and then the walking pad can be lowered to a surface, enabling the device to effectively "walk" on the walking pads. Then the device can be free to travel in the second direction on the rollers.

Figure 5:
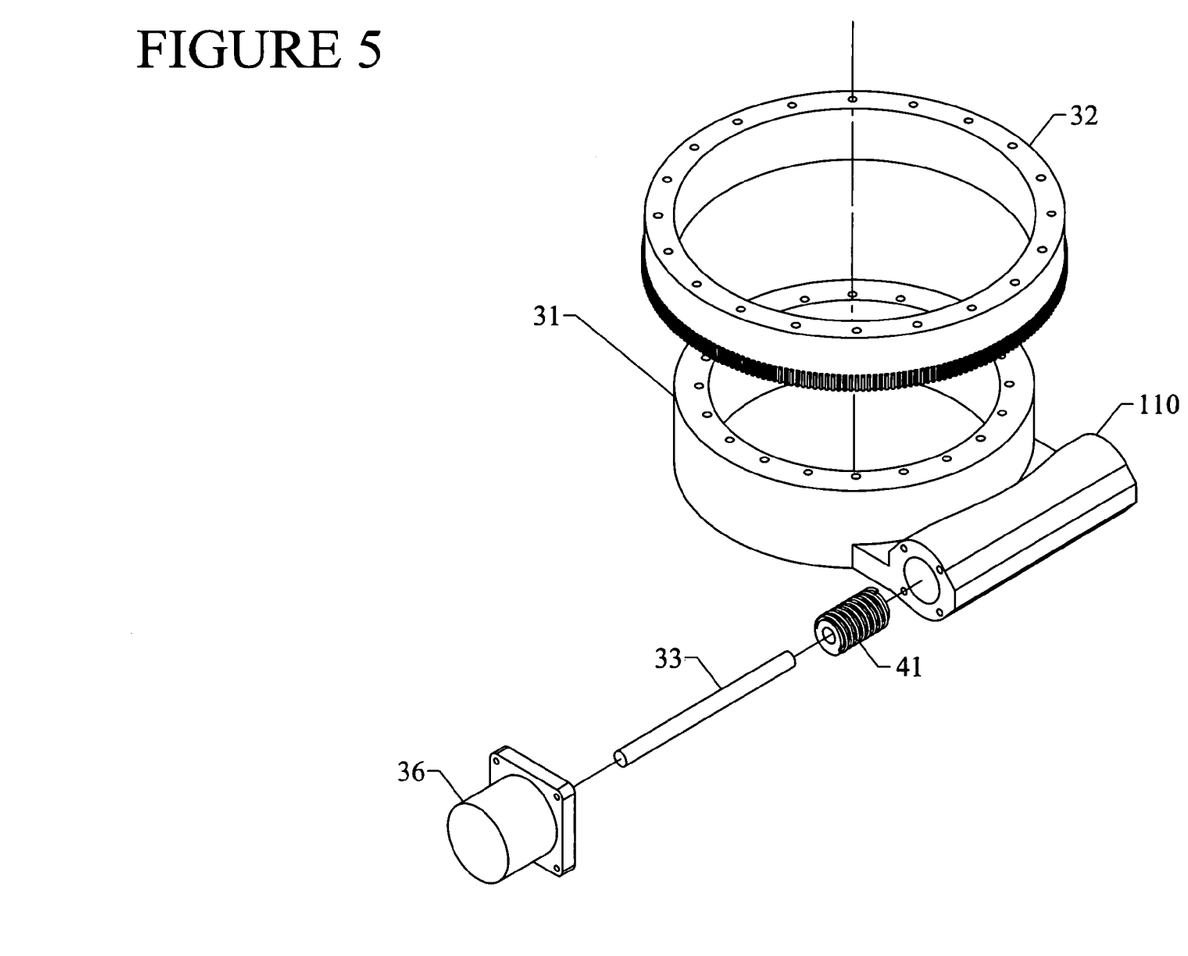
FIG. 5 depicts an exploded view of the rotatable motion gear assembly.

FIG. 5 depicts an exploded view of the stationary ring 31 inside the rotating ring 32. The stationary ring 31 can be secured to a worm housing 110. A gear 41 can engage a gear shaft 33 that can also be secured to the worm housing. A motor 36 can operate the gear shaft 33.

Figure 6:
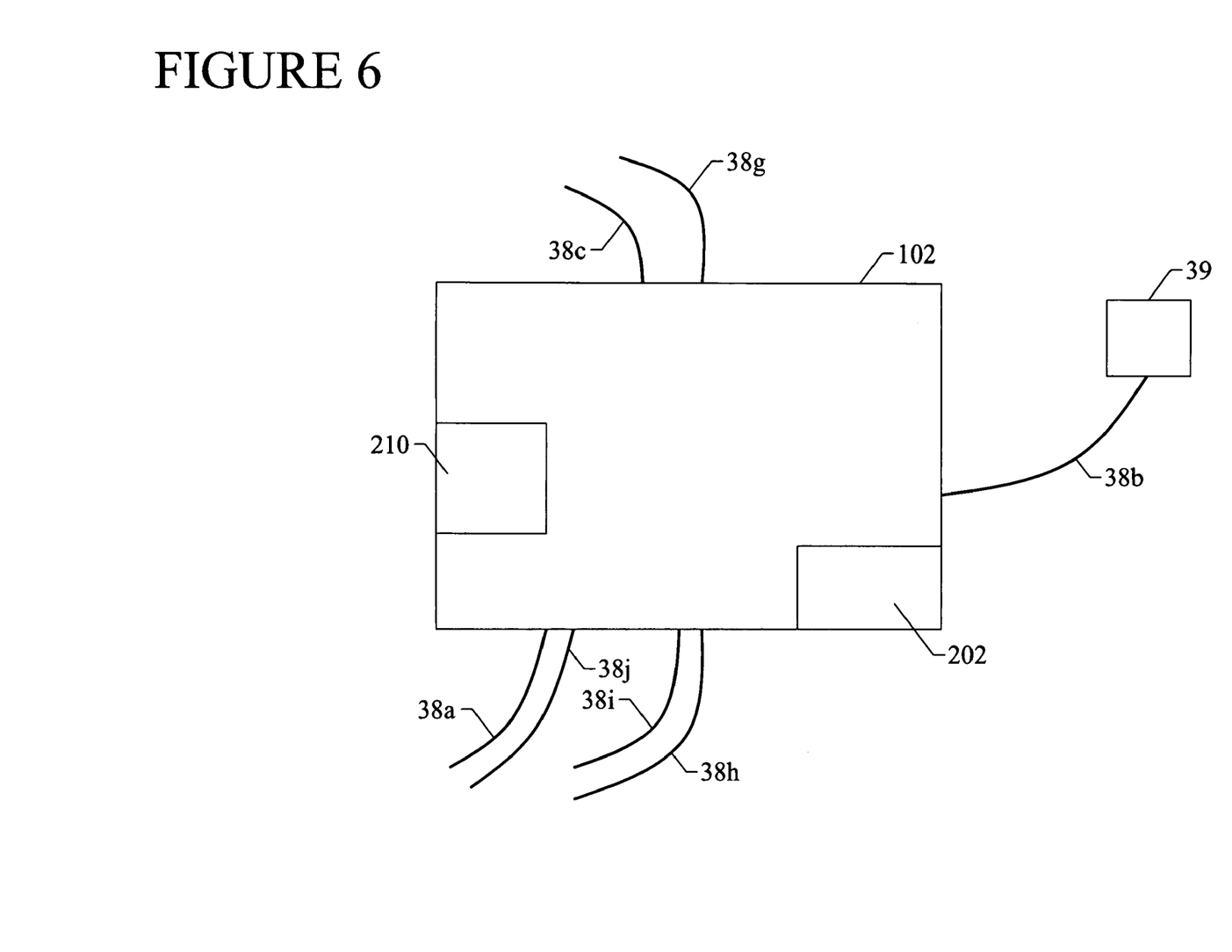
FIG. 6 depicts an embodiment of controlling means usable in this system.

FIG. 6 shows a detail of the controlling means 102 with the processor 202 and GPS system 210.

The controlling means 102 has an inlet for receiving fluid 38b from a fluid source 39 and flowing it out as two fluids 38a and 38c to different components of the walking pad assembly 2. The fluid 38a goes from the controlling means to the stationary ring 40 of the pivoting collar 21 and the fluid 38c goes from the controlling means to the lift assembly 8.

FIG. 7 shows a detail of the roller bearing surface 30 for engaging the roller tread 5 over which is disposed the roller tread housing 1.

While these embodiments have been described with emphasis on the embodiments, it should be understood that within the scope of the appended claims, the embodiments might be practiced other than as specifically described herein.

What is claimed is:

1. A system for positioning a transportable and relocatable equipment comprising:
   (i) at least four walking assemblies attached to a transportable and relocatable equipment; wherein each walking assembly comprises:
      (a) a walking pad for walking on surface with rolling load bearing surface for engaging a surface;
      (b) roller tread for rolling the roller load bearing surface;
      (c) a roller tread housing for containing the roller tread, and wherein the roller tread housing comprises a central collar; and
      (d) a lift assembly connected to the central collar, wherein the lift assembly comprises:
         (1) a rod for engaging the central collar;
         (2) a flange slidably disposed around the rod; and
         (3) a lifting device removably connected to the flange;
   (ii) a rotatable motion gear assembly disposed around the lift assembly;
   (iii) a motor for actuating the rotatable motion gear assembly;
   (iv) a pivoting collar disposed around the rod for receiving a first fluid from a controlling means and dispensing a working fluid, and wherein the pivoting collar comprises:
      (a) a collar stationary segment disposed around the rod;
      (b) a collar rotating segment disposed around the collar stationary segment; and
      (c) wherein the first fluid flows to the collar stationary segment and then to the collar rotating segment enabling hose-free rotating of the pivoting collar;
   (v) a push pull travelling system for receiving the working fluid, wherein the push pull travelling system further comprises a push pull traveling system first side secured to one side of the roller tread housing and a push pull traveling system second side disposed on an opposite side of the roller tread housing; wherein the push pull travelling system is a member of the group consisting, a set of hydraulic pistons, a set of rack and pinion system, a set of pneumatic pistons, a set of linear actuators, or a set of magnetically operable sleds, and wherein the push pull travelling system is adapted to extend a specified distance causing movement of the equipment in a first direction;
   vi. controlling means with a processor for receiving a second fluid from a fluid source and flows out the first fluid to the collar stationary segment and flowing a third fluid to the lift assembly enabling the walking assemblies to raise, reorient, lower, and travel of the transportable and relocatable heavy equipment in a second direction using the treads; and vii. sensor means secured to each flange in communication with the processor for providing orientation feedback from each walking assembly.

2. The system of claim 1, wherein the rotatable motion gear assembly is a rack and pinion or a rotary gear set.

3. The system of claim 1, wherein the flange can comprises a square flange for removably engages the transportable and relocatable equipment and is removably attached to a round flange for providing a sealing engagement with the lifting device.

4. The system of claim 1, wherein the central collar is formed from a first collar half that connects with a second collar half.

5. The system of claim 1, wherein the rotatable motion gear assembly is a hydraulic slewing drive.

6. The system of claim 1, wherein the rotatable motion gear assembly comprises a stationary ring surrounded by a rotating ring, further wherein the rotating ring is actuated by a gear supported on a gear shaft driven by the motor.

7. The system of claim 1, wherein the push pull travelling system first side comprises a first hydraulic cylinder and the push pull travelling system second side comprises a second hydraulic cylinder, wherein each of the hydraulic cylinders extends between the roller tread housing and the walking pad so the roller tread housing moves a stroke distance causing the transportable and relocatable heavy equipment to travel a proportional distance.

8. The system of claim 1, wherein for each walking pad of the plurality of walking pads, each rod can be positioned at different vertical heights.

9. The system of claim 1, wherein for the plurality of walking pads at least two rods can be positioned for synchronous movement.

10. The system of claim 1, wherein the transportable and relocatable equipment is a drilling rig.

11. The system of claim 1, wherein the collar rotating segment enables hose-less pivoting while rotating the hydraulic pivoting collar more than 360 degrees.

12. The system of claim 1, further comprising a positive locating device disposed around the rod, and wherein the positive locating device is a member of the group consisting of: a stop, a magnet, a gear set, or combinations thereof.

13. The system of claim 1, wherein the lift assembly is a hydraulic lift assembly.

14. The system of claim 1, wherein the lifting device is a hydraulic lifting device.

15. The system of claim 1, wherein the pivoting collar is a hydraulic pivoting collar.

16. The system of claim 1, wherein the first and second fluids are hydraulic fluids, compressed air, a compressed gas, or a compressed vapor mixture.

* * * * *